TELEVISION RECEIVER

Filed April 6, 1959

2 Sheets-Sheet 1

INVENTOR
PETER JOHANNES HUBERTUS JANSSEN
ANTONIUS BOEKHORST
BY Frank R. Jifari
AGENT INVENTOR
PETER JOHANNES HUBERTUS JANSSEN
ANTONIUS BOEKHORST
BY
Frank R. Jeifari
AGENT 3,024,307

TELEVISION RECEIVER

Peter Johannes Hubertus Janssen and Antonius Boekhorst, Eindhoven, Netherlands, assignors to North American Philips Company, Inc., New York, N.Y., a corporation of Delaware Filed Apr. 6, 1959, Ser. No. 804,343
Claims priority, application Netherlands Apr. 26, 1958
5 Claims. (Cl. 178—7.5)

This invention relates to television receivers in which the size of the portion of the screen of the picture tube used effectively for reproduction has an aspect ratio which differs from the aspect ratio determined by the incoming television signal.

In such television receivers the following difficulties occur in proportionting the circuit arrangement for producing of line deflection and in operating the picture tube.

As a result of recent developments, the dimensions of the viewing screens become larger and larger, so-called 17, 21 and 24 inch tubes. In addition, the aim is to manufacture the tube as such of shorter length despite the larger dimensions of the screens.

Consequently, it is common practice nowadays to utilize the so-called 110° angle of deflection. As a result thereof, the glass wall of the cone, that is to say, the junction piece between the neck and the viewing screen, which must be as closely as possible adjacent the sides of the 110° angle of deflection, must be more sloped than in the case of a 90° angle of deflection. In order to avoid undue steepness, more particularly for the said larger tubes, one has proceeded for structural reasons to replacing the original aspect ratio of 3:4 by an aspect ratio of 4:5, in a manner such that with the same height or with the same diagonal of the screen for the size concerned, the width (that is to say the horizontal direction) of the viewing screen has become smaller. This affords the advantage that the wall of the cone becomes less steep, at least for the horizontal direction, than with an aspect ratio of 3:5, resulting in the cone having a greater resistivity and also the consumption of glass being less. However, various difficulties occur in operating such tubes having a different aspect ratio. In the first place, a source of interference is the so-called overscanning in the direction of the line deflection, as a result of which secondary electrons and reflected primary electrons swarm out across the screen, resulting in an undesirable illumination of the back-ground which detrimentally affects the contrast of the picture reproduced. (See, for example, the article by "W. D. Schuster," "E. O. Stone" and "C. E. Torsch" in IRE Wescon Convention Record 1957, part 7, pages 62–71.)

A second disadvantage is that, with the present state of the art, very great peak currents must be supplied by the driving elements more particularly for the large tubes. Especially if electron tubes are used for this purpose, this implies that it is necessary to use either very heavy line output tubes or two or more such tubes connected in parallel.

Furthermore, with such great peak currents, the mean currents of the line output tubes are also great, so that the power supply device of the receiver must be capable of supplying such great mean currents.

The receiver according to the invention mitigates these disadvantages and is characterized in that the circuit arrangement present in the receiver for producing a sawtooth deflection current for the deflection of at least one electron beam in the direction of the line deflection of the picture tube is proportioned so that the fly-back time and the peak-to-peak value of the sawtooth deflection current are adapted to the aspect ratio of the portion of the screen used effectively for reproduction, and that the receiver comprises means for producing a voltage which permits the electron beam or beams to be suppressed at least during the said fly-back time.

In order that the invention may be readily carried into effect, it will now be described in detail, by way of example, with reference to the accompanying drawings, in which FIG. 1 shows the dimensions of the viewing screen of a picture tube;

FIG. 2 serves for clarification;

Figure 1:
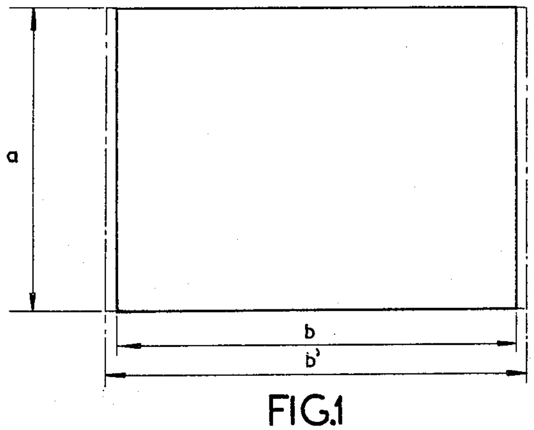

As is well-known, the viewing screens of picture tubes manufactured nowadays have dimensions which differ from those which would be necessary for a proper reproduction of the signal received from the transmitter. Thus, FIG. 1 shows a viewing screen having a height of $a$ cm. and a width of $b$ cm. For picture tube of modern type said dimensions are in a proportion of 4:5. For the sake of simplicity, this ratio will be referred to as the aspect ratio of the viewing screen (hence $a:b=4:5$). However, the dimensions of the picture to be reproduced, which are determined by the aspect ratio of the incoming signal, are $a'$ cm. for the height and $b'$ cm. for the width, $a':b'=3:4$.

As mentioned in the preamble, for structural reasons, with the same height for the size concerned, the width of the viewing screen has become smaller, that is to say, $a'$ has been chosen equal to $a$ and $b$ has been chosen smaller than $b'$. This is represented in FIG. 1 by the vertical dot-and-dash lines and by the horizontal full lines. Thus, for this figure there applies:

$a:b=4:5$ (aspect ratio of the viewing screen)

and $a':b'=3:4$ (aspect ratio of the incoming signal)

According to the present standard, the incoming television signal does not contain video-information during 18% of each line period (suppression period), which means that the electron beam in the picture tube can be suppressed during this time by means of said signal. In addition, it is common practice in the latest television technique to choose the fly-back period of the sawtooth current produced for deflection of the electron ray in the direction of line deflection to be 15% of the line period, so that the imaginary fly-back of the electron beam, though suppressed, is finished before the suppression is eliminated.

For the modern tubes this means that the electron beam would be deflected through a distance of $b'$ cm. without being suppressed, if at least the dimensions of the screen would allow this. However, the screen actually has a width of $b$ cm., so that the electron ray at the edges of the screen impinges on the side walls and even on the inner wall of the funnel-like part connected directly to the neck of the tube.

As a result of this so-called overscanning, the electron beam upon striking the side walls and the said inner wall dislodges secondary electrons from the aquadag layer and aluminium film covering the said walls or even from the glass itself, the amount of secondary electrons dislodged being greater as the image at the edges is brighter, which is always the case, for example, with an object placed in front of a clear background. The cloud of secondary electrons thus evolved swarms across the viewing screen and provides a percentage contribution to the production of light, which percentage is stronger as the primary electrons (which originate directly from the locally scanning electron beam) do this to a lesser extent. In addition, the rapid primary electrons reflected by the said walls contribute to an undesirable illumination of the background. The contrast of the image to be reproduced is thus influenced very detrimentally by the said overscanning.

A second disadvantage resides in the fact that a considerable deflection peak current is necessary for the large angle of deflection of 110°. Said peak currents become so great the special line output tubes would have to be developed therefor, or existing tubes capable of supplying such peak currents would have to be connected in parallel.

According to the invention, all said disadvantages are overcome by increasing the fly-back period of the sawtooth current and deriving from this current a pulsatory voltage which permits of suppressing the beam current during the increased fly-back period.

It will now be explained hereinafter that the anode peak current of the line output tube and also the peak current of the series-booster diode are thus considerably reduced with respect to those required in the known technique.

Figure 2:
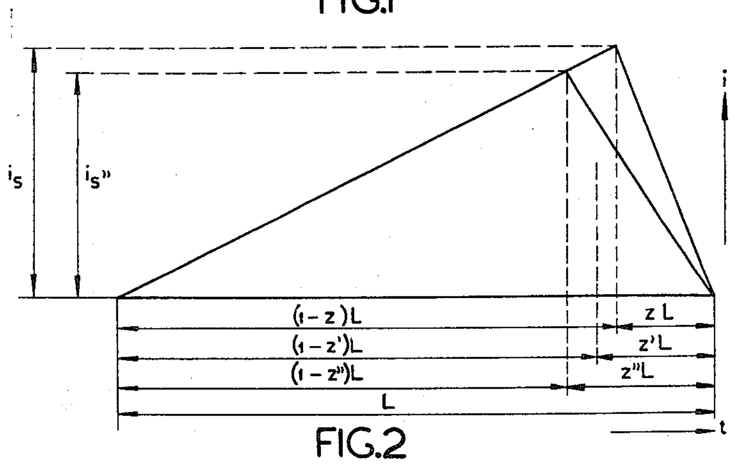

FIG. 2 shows one cycle of a sawtooth deflection current as a function of time.

If one line period is L sec. and the fly-back period is $z.L$ sec., such a fly-back period requires a peak-to-peak value for the current of $i_s$ amp., wherein $$z=\frac{\Delta L}{L}$$

and wherein ΔL indicates the fly-back period chosen. As previously mentioned, in the conventional systems a value of 15% is chosen for $z$. However, in this case, only the $(1-z')L$ part of the total line period L is used for scanning the screen in the horizontal direction by means of the electron beam, whereas the beam is suppressed for $z'.L$ sec. The $z'$ is determined by the incoming signal and, for example, for the European 625-line system is, on the average, 18%.

The horizontal dimensions of the image to be reproduced are thus determined by the time $(1-z')L$.

If the vertical suppression time determined by the incoming signal is $x'.B$, wherein B is the time required for writing a raster, the vertical dimensions of the image reproduced are determined by a time of $(1-x')B$ sec.

The ratio of the said two times must satisfy the aspect ratio determined by the transmitter, that is to say:

$$(1-x')B:(1-z')L=a':b'$$

in which $a':b'=3:4$, for the majority of television systems used nowadays.

If the aspect ratio of the viewing screen differs from the aspect ratio determined by the transmitter and the vertical dimensions must remain constant, this means that the time $(1-x')B$ remains the same and that for the new aspect ratio there must apply:

$$(1-x')B:(1-z'')L=a:b$$

wherein $z''.L$ represents the new period of suppression. The actual satisfactory methods of synchronization permit the beginning of the horizontal fly-back to be determined very accurately, so that it is possible to disregard the difference between the fly-back time and the suppression time. The fly-back time of the sawtooth current is thus also assumed to be $z''.L$ sec.

Figure 3:
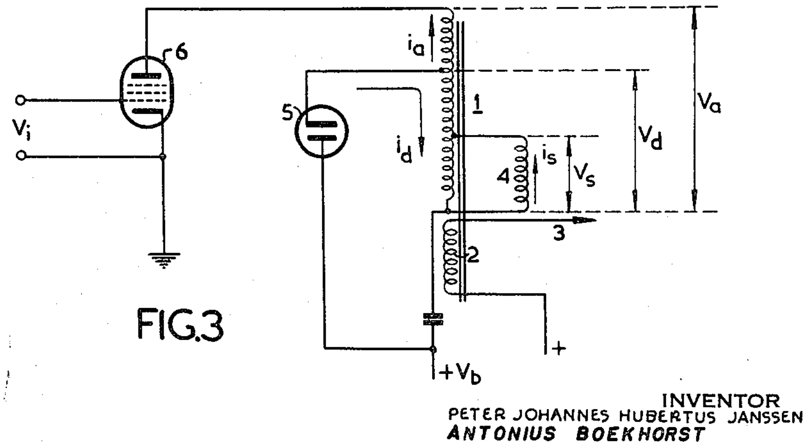
FIG. 3 shows the circuit arrangement employed for producing a sawtooth deflection current having line frequency.

This affords two advantages:

(1) If a circuit known per se is used for producing a sawtooth current as shown in FIG. 3, a pulse produced across the windings of the line output transformer 1 during the fly-back time $z''.L$ may be derived from an auxiliary winding 2 and supplied through a lead 3 to an electrode of the picture tube with a polarity cutting off the beam current. With the fly-back time chosen, the pulse produced automatically has a duration of $z''.L$ sec., so that by means of the pulse supplied through the lead 3 to the picture tube, the electron ray is suppressed for $z''.L$ sec. and, since the suppression pulse has been derived from the sawtooth deflection current, there cannot be a phase difference between the fly-back and the suppression pulse.

Due to the longer fly-back period of the sawtooth deflection current with the associated peak-to-peak current $i''_s$, the disadvantage of overscanning would already be avoided without suppression of the electron ray, since the latter no longer reaches the undesired zone. However, without suppression, the electron beam would be modulated during a portion of the fly-back period so that video-information would be written over the normal images. This is avoided by simultaneous suppression of the beam.

It is to be noted that it is desirable to avoid modulation of the electron beam both at the beginning and at the end of a line period. In order to achieve this, the suppression of the electron beam must already begin before the occurrence of the line synchronization pulse proper. However, this may be ensured with the actual indirectly-synchronized line-deflection generators in a very simple manner.

With direct synchronization it would be impossible by the said steps to anticipate the moment of the beginning of the fly-back, video-information always being lost at the beginning of a line due to the longer period of suppression. It it true that video-information is lost due to the above-mentioned steps, but it would all the same have been invisible for the observer because of the modified aspect ratio. However, the disadvantage of overscanning and the drawbacks coherent therewith are completely avoided, while the picture tube as such need not be modified at all.

(2) As previously mentioned, both the anode peak current and the peak current of the series-booster diode are considerably reduced by the said step.

In fact, from the above-mentioned formulas it follows that:

$$(1-x')B:(1-z')L=a':b'$$

and $$(1-x')B:(1-z'')L=a:b$$

or $$z''.L=L-\frac{a'}{b'}\cdot\frac{b}{a}(1-z')L$$

For $a':b'=3:4$; $a:b=4:5$ and $z'=18\%$ it follows therefrom after some conversion:

$$z''=23.15\%$$

If instead of the height, the diagonal of the screen is maintained constant for the size concerned, the foregoing remains true to the full extent. With the last-mentioned method, upon passing from an aspect ratio of 3:4 to one of 4:5, the height of the viewing screen becomes greater, but its width becomes less.

Comparison of the two methods shows that, upon passing from one aspect ratio to another, the width of the viewing screen in the last-mentioned method has increased with respect to the first-mentioned method. The surface of the viewing screen of a tube manufactured by the method of the constant diagonal is also larger with an aspect ratio of 4:5 than with one of 3:4, while the advantages of a more resistant tube and a smaller consumption of glass are nevertheless retained.

With constant height, as may be seen from FIG. 1, the surface becomes smaller, but the above-mentioned advantages becomes a little greater.

In the case of a picture tube having a constant diagonal, the peak-to-peak value of the sawtooth deflection current for the vertical direction must be a little higher. This is not objectionable, since the frequencies are much lower than for the direction of the line deflection, so that the current supplied by the output tube may be sufficiently stepped up by the output transformer without the peak voltage set up across the tube, during the vertical fly-back period, exceeding the values permissible for this tube. The vertical fly-back period is also maintained constant, so that both the vertical dimension determined by the incoming signal and that required for scanning the viewing screen in vertical direction are determined by the time of $(1-x')B$ sec. The foregoing calculations thus also apply to a tube having a constant diagonal, so that for such tubes also there applies a new fly-back period $z''.L$, for which $z''$ is 23.15%.

The circuit arrangement of FIG. 3 shows the various currents traversing the windings and the deflection coil 4, and the various voltages produced across the windings. Thus, the deflection coil 4 is traversed by the sawtooth current proper having a peak-to-peak value $i_s$, a voltage $V_s$ being set up across this coil. During the fly-back stroke, the peak voltage across the coil 4 may be calculated with the aid of the formula:

$$\hat{V}_s=\frac{\pi}{z.L}\cdot\frac{i_s}{2}\cdot L_s$$

wherein zL represents the fly-back period, LS represents the induction of deflection coil 4, and $i_s/2$ represents half the value of the peak-to-peak current $i_s$.

In the conventional systems $z=0.15$, so that for the peak voltage there is found:

$$\hat{V}_s=10.47\frac{i_s L_s}{L}$$

For the increased fly-back period, $z''$ becomes 0.2315, so that the voltage set up across coil 4 becomes equal to:

$$\hat{V}_s''=6.78\frac{i_s'' L_s}{L}$$

If, for a fly-back period of 15%, the number of the turns on transformer 1 up to the tapping to which the upper end of coil 4 is connected is assumed to be equal to $k$, up to the tapping to which the cathode of the series-booster diode 5 is connected equal to $n_d.k$ and the total number of the turns on the transformer equal to $n_a.k$, the peak voltage on the cathode of diode 5 is equal to $\hat{V}_d=n_d.\hat{V}_s$ and that on the anode of the line output tube 6 is equal to $\hat{V}_a=n_a.\hat{V}_s$.

If, for a fly-back period of 23.15%, said numbers of turns are chosen to be $k''$, $n_d''k''$ and $n_a''k''$, respectively, the various voltages are:

$$\hat{V}_d''=n_d''.\hat{V}_s'' \text{ and } \hat{V}_a''=n_a''.\hat{V}_s''$$

From the foregoing it follows that—
for a fly-back period of 15% the voltages are:

$$\hat{V}_d=n_d\cdot 10.47\frac{i_s L_s}{L}$$

$$\hat{V}_a=n_a\cdot 10.47\frac{i_s L_s}{L}$$

and for a fly-back period of 23.15%:

$$\hat{V}_d''=n_d'' 6.78\frac{i_s'' L_s}{L}$$

$$\hat{V}_a''=n_a''\cdot 6.78\frac{i_s'' L_s}{L}$$

Now, a given series-booster diode can resist a certain maximum voltage at which it is not damaged. This value is the same for either case, so that it may be assumed:

$$\hat{V}_d=\hat{V}_d''$$

from which it follows:

$$\frac{n_d}{n_d''}=\frac{6.78}{10.47}\cdot\frac{i_s''}{i_s}=0.65\frac{i_s''}{i_s}$$

The same is true of the maximum peak voltage permissible on the anode of the line output tube 6, so that in this case also there applies: $\hat{V}_a=\hat{V}_a''$, from which it may be deduced in a similar manner:

$$\frac{n_a}{n_a''}=0.65\frac{i_s''}{i_s}$$

Now, the negative half of the sawtooth current $i_s$ is provided by the current $i_d$ traversing the series-booster diode and its positive half by the anode current $i_a$ traversing the transformer 1 in the opposite sense.

In the idealised case (that is to say, the Q of the circuit constituted by the elements in the anode circuit of tube 6 is infinite) there applies:
for 15% fly-back period:

$$i_d=\frac{1}{n_d}\frac{i_s}{2} \text{ and } i_a=\frac{1}{n_a}\frac{i_s}{2}$$

for 23.15% fly-back period:

$$i_d''=\frac{1}{n_d''}\frac{i_s''}{2} \text{ and } i_a''=\frac{1}{n_a''}\frac{i_s''}{2}$$

From this it follows by division of the corresponding currents:

$$\frac{i_d''}{i_d}=\frac{n_d}{n_d''}\cdot\frac{i_s''}{i_s} \text{ and } \frac{i_a''}{i_a}=\frac{n_a}{n_a''}\cdot\frac{i_s''}{i_s}$$

Substituting in the latter formulas the resultant ratios of the turns, gives:

$$\frac{i_d''}{i_d}=0.65\left(\frac{i_s''}{i_s}\right)^2 \text{ and } \frac{i_a''}{i_a}=0.65\left(\frac{i_s''}{i_s}\right)^2$$

From FIG. 2 it follows that:

$$\frac{i_s''}{i_s}=\frac{1-Z''}{1-Z}=0.904$$

so that for the new currents there is ultimately found:

$$i_d''=0.526 i_d \text{ and } i_a''=0.526 i_a$$

that is to say, both the current traversing the series-booster diode and the anode current traversing tube 6 are reduced substantially to half the original value.

By increasing the fly-back period, it is thus possible to operate a large picture tube with a deflection angle of 110° and nevertheless to manage with one existing line output tube, for example one tube PL81, whilst no additional requirements are imposed upon the series-booster diode.

The foregoing becomes even more favourable considering the fact for both the 15% and the 23.15% fly-back time the said circuit in the anode circuit of tube 6 is not ideal.

If the resonance frequency of the said circuit is $f$ c./s., the relationship between the fly-back period and the resonance frequency is given by:

$$f=\frac{1}{2z.L}$$

For $z=15\%$, the elements of said circuit must be chosen so that there applies:

$$z.L=\frac{1}{2f} \text{ or } f=\frac{1}{0.30.L}$$

For $z''=23.15\%$ is:

$$z''.L=\frac{1}{2f''} \text{ or } f''=\frac{1}{0.463.L}$$

from which it follows that $f''<f$.

The fly-back period desired may thus be obtained by correct proportioning of the said circuit so that it acquires a resonance frequency of $f''$ c./s.

As is well-known, the Q of a circuit may be improved as its resonance frequency is lower. Since, in the case under consideration, $f''<f$, the Q of the circuit in the anode circuit of tube 6 is more satisfactory at a $z''$ of 23.15% than at a $z$ of 15%. The losses of the said circuit thus decrease so that the total energy to be supplied by tube 6 in the non-ideal case is less with a longer fly-back period than with a shorter fly-back period. For this reason also, with constant supply voltage, the anode peak current can be smaller in the case of the long fly-back time than that in the case of the short fly-back time. This improvement is about 10%, so that the anode peak current may ultimately be reduced to 50% with the same deflection coils.

An additional advantage is that for the lower outswing frequency of the said anode circuit, the possibility of adjacent wireless receivers being interfered decreases.

It will be evident that the gain in the saving of current need not always be realized completely. Thus, it may occur, for example, that the reserve of the series-booster diode is greater than that of the line output tube. In this case $\hat{V}_d''$ may be less than the maximum peak voltage permissible for the series-booster diode. The same possibility naturally also exists for the line output tube if its reserve is greater than that of the series-booster diode. The transformation ratio must therefore be determined in accordance with the above-mentioned formulas in each individual case.

This transition of aspect ratio is also important for colour television picture tubes if there is worked with an angle of deflection of 110°. The circuit arrangement as such need usually not be modified at all, since in the majority of cases the three electron beams are deflected in one picture tube by means of one set of deflection coils. It will only be necessary for the suppression pulse produced to be supplied to all three electron guns in order to ensure that all three electron beams are suppressed during the increased fly-back period.

Figure 4:
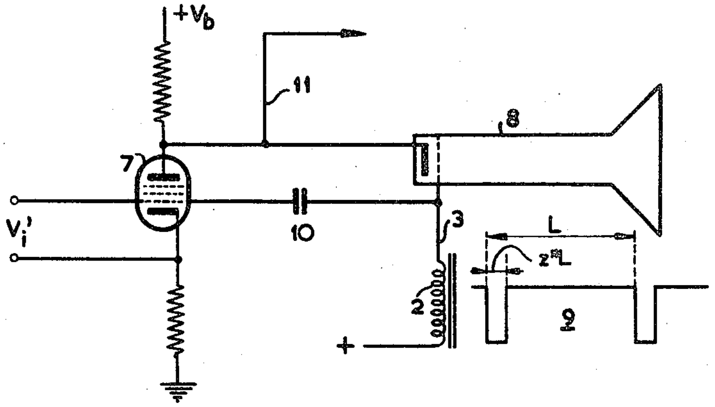
FIG. 4 shows a circuit arrangement for suppressing the beam current in the picture tube during the adapted fly-back time of the lines.

FIG. 4 shows in what manner the voltage pulse set up across the auxiliary winding 2 may be used to suppress the beam current in the picture tube. In this figure, tube 7 is the video-output tube to which the video-signal $V_i'$ is supplied and the anode of which is connected to the cathode of a picture tube 8. The Wehnelt cylinder of tube 8 is connected to one end of auxiliary winding 2, the other end of which is connected to the positive terminal of a voltage source (not shown). This source may comprise a potentiometer coupled to the power supply apparatus of the receiver and the tapping of which is connected to the lower end of the winding 2. Displacement of the tapping permits of regulating the value of the beam current in the non-suppressed condition so that it is thus possible to vary the brightness of the picture reproduced. The pulse 9 of negative polarity set up across auxiliary winding 2 are now of sufficient value to suppress the electron beam during the period $z''\cdot L$. It is also possible for the winding 2 to be connected to earth, at one end, and to be coupled, at its other end, through a sufficiently large capacitor to the Wehnelt cylinder. The positive voltage for adjusting the brightness may then be applied directly to the Wehnelt cylinder.

A capacitor 10 is provided in orded to prevent the synchronization of the receiver from being detrimentally affected by the supply of signal 9. In fact, the total television signal is derived from the anode of tube 7 and supplied through a lead 11 to a synchronization separator in which the synchronizing pulses are separated from the rest of the signal and subsequently used for synchronizing the horizontal and vertical deflection generators. Since the Wehnelt cylinder and the cathode of tube 8 constitute a certain capacitance $C_{wk}$, the signal 9 is also supplied through this $C_{wk}$ to the lead 11 and this signal is liable to distort the synchronizing pulses. In order to avoid this, the signal 9 is also supplied through capacitor 10 to the control grid of tube 7. Due to the phase-inverting action of tube 7, the signal set up at the anode thereof is in phase opposition to the signal supplied through $C_{wk}$ to the lead 11. If the impedance in the grid circuit of tube 7 is indicated by $Z_g$ and that in the anode circuit of the tube 7 by $Z_a$ and if this tube has an A-fold amplification, then if there applied that $A.Z_a=Z_g$ and $C_{10}=C_{wk}/A$, the amplitude of the signal suplied via $C_{wk}$ is equal to that of the signal supplied via tube 7. The two signals thus neutralize each other so that the synchronizing pulses are not interfered by the additional suppression signal supplied.

Figure 5:
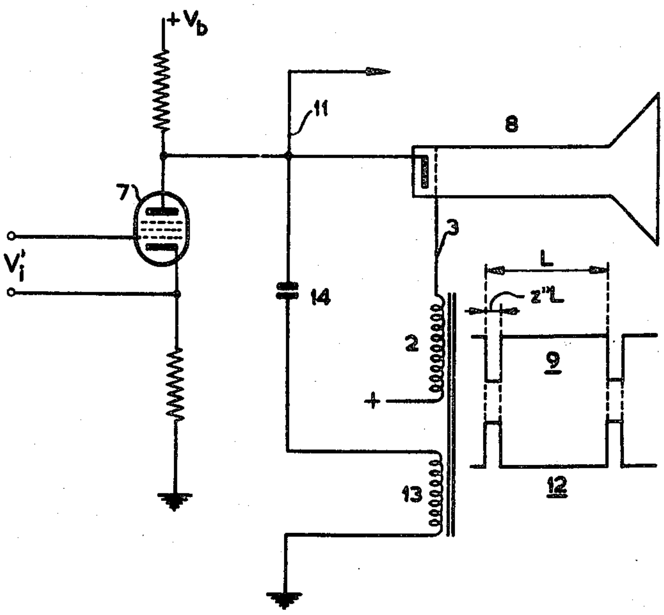
FIG. 5 shows a circuit arrangement which is modified with respect to that of FIG. 4.

A second method of preventing differential suppression pulses in the synchronizing signal is illustrated in FIG. 5. In this figure, in which corresponding parts are indicated by the same reference numerals as in FIG. 4, an additional pulsatory signal is derived from an auxiliary winding 13. The latter is arranged on the transformer 1 so that the signal set up across it has a polarity opposite to that of the signal 9 and an amplitude such that, after being supplied through capacitor 14 to the lead 11, it exactly eliminates the signal 9 which is supplied through $C_{wk}$.

The circuit arrangements of FIGS. 3, 4 and 5 as above described and the calculations made in connection therewith for a transition of the aspect ratio from 3:4 to 4:5 have been given only by way of example. Similar adaption of the fly-back period of the sawtooth current is also possible with another aspect ratio of the viewing screen. In addition, the circuit arangement shown in FIG. 3 may be operated with transistors so far they can resist the peak voltages occurring. The supply of the required peak curents does not usually involve much difficulty.

When use is made of transistors, the present invention provides the possibility of decreasing the peak voltages occurring, since from the formulas for $V_a$ and $V_a''$ it follows that:

$$\frac{\hat{V}_a''}{V_a}=\frac{n_a''6.78\frac{i_s''L_s}{L}}{n_a10.47\frac{i_sL_s}{L}}=\frac{n_a''}{n_a}\cdot\frac{i_s''}{i_s}0.65$$

For the peak currents to be supplied by the driving transistor (which correspond to the anode currents supplied by tube 6) there may be written:

$$\frac{i_a''}{i_a}=\frac{n_a}{n_a''}\cdot\frac{i_s''}{i_s}$$

Choosing now $i_a=i''_a$, it follows therefrom:

$$\frac{n_a''}{n_a}=\frac{i_s''}{i_s}$$

Substituting this in the above-mentioned formula results in:

$$\frac{\hat{V}_a''}{\hat{V}_a}=0.65\left(\frac{i_s''}{i_s}\right)^2=0.526$$

wherein the values for $i''_s/i_s$ found above are substituted. The possibility mentioned above is proved therewith.

It will be evident that in this case $i''_a=i_a$ is the maximum peak current permissible for the driving transistor.

It is to be noted that if there is worked with a viewing screen having an aspect ratio of 3:4, transition to an aspect ratio of 4:5 is also possible by arranging in front of the screen a mask having the dimensions which satisfy the last-mentioned aspect ratio. In operating the picture tube by the method above described, video-information is lost indeed, but a saving of current may again be obtained if use is made of electron tubes, or a gain in the maximum permissible peak voltage occurring is possible if transistors are used as driving elements.

In conclusion, it is mentioned that the fly-back period need not always be increased from 15% to 23.15% of the line period. Thus, 21% for the new fly-back period may be sufficient, whereby a reasonable saving in current is already possible, whilst the suppression pulse having a suppression time of 23.15% of the line period is derived in another way. This may be effected, for example, by supplying the line synchronizing pulses to a pulse-distorting mono-stable multivibrator circuit.

True the last-mentioned steps result in the equipment being extended and the advantage of the rigid coupling together of fly-back and suppression being lost, but if it is preferred to keep a little play between the said two magnitudes, the last-mentioned method provides a possibility of solution.

What is claimed is:

1. A television receiver comprising a source of television signals for an image having an aspect ratio $a':b'$, an image reproducing device having a screen in which the size of the portion thereof used for undistorted reproduction has an aspect ratio $a:b$ different from the ratio $a':b'$, said image reproducing device having means for directing an electron beam against said screen, means producing a current having a sawtooth shaped waveform for deflecting said beam, said sawtooth current producing means comprising means controlling the fly-back time and peak-to-peak amplitude of said current for the aspect ratio $a:b$, and means connected to said sawtooth current producing means for suppressing said electron beam during said fly-back time, the aspect ratio $a:b$ being greater than the aspect ratio $a':b'$, said fly-back time controlling means comprising means providing a fly-back time longer than the signal suppression time of said television signals for each line period, whereby only the portion of said screen that is used for image reproduction is scanned by said electron beam.

2. A television receiver comprising a source of television signals for an image having an aspect ratio $a':b'$, an image reproducing device having a screen in which the size of the portion thereof used for undistorted reproduction has an aspect ratio $a:b$ different from the ratio $a':b'$, said image reproducing device having means for directing an electron beam against said screen, means producing a current having a sawtooth shaped waveform for deflecting said beam, said sawtooth current producing means comprising means providing a sawtooth waveform current having a fly-back time $z''$L equal to:

$$z''L=L-\frac{a'}{b'}\cdot\frac{b}{a}(1-z')L$$

where L is the line period, and $z'$L is the portion of the line period L during which said television signals contain no video information, and means for suppressing said electron beam during said fly-back time.

3. A television receiver comprising a source of television signals for an image having an aspect ratio $a':b'$, an image reproducing device having a screen in which the size of the portion thereof used for undistorted reproduction has an aspect ratio $a:b$ different from the ratio $a':b'$, said image reproducing device having means for directing an electron beam against said screen, means producing a current having a sawtooth shaped waveform for deflecting said beam, said sawtooth current producing means comprising a driving element having an input circuit and an output circuit, means connected to said input circuit for periodically rendering said driving element non-conductive, said output circuit comprising output transformer means, a unilaterally conductive element connected to said transformer means, and a deflection coil coupled to said transformer means, said output circuit having a resonant frequency $f''$ substantially equal to:

$$f''=\frac{1}{2z''L}$$

where $z''$L is the fly-back time, and $$z''L=L-\frac{a'}{b'}\cdot\frac{b}{a}(1-z')L$$

where L is the line period and $z'$L is the portion of the line period L during which said television signals contain no video information.

4. A television receiver comprising a source of television signals for an image having an aspect ratio $a':b'$, an image reproducing device having a screen in which the size of the portion thereof used for undistorted reproduction has an aspect ratio $a:b$ different from the ratio $a':b'$, said image reproducing device having means for directing an electron beam against said screen, means producing a current having a sawtooth shaped waveform for deflecting said beam, said sawtooth current producing means comprising means controlling the fly-back time and peak-to-peak amplitude of said current for the aspect ratio $a:b$, video amplifier means, means applying said signals to the input of said amplifier means, said image reproducing device having first and second beam controlling electrodes having inherent capacitive coupling, means applying the output signals of said amplifier means to said first electrode, means connecting said sawtooth current producing means to said second electrode for suppressing said electron beam during said fly-back time, and capacitor means coupling said sawtooth current producing means to said input of said amplifier means whereby signals coupled to the output of said amplifier means through the capacitive coupling of said electrodes are canceled.

5. A television receiver comprising a source of television signals for an image having an aspect ratio $a':b'$, an image reproducing device having a screen in which the size of the portion thereof used for undistorted reproduction has an aspect ratio $a:b$ different from the ratio $a':b'$, said image reproducing device having means for directing an electron beam against said screen, means producing a current having a sawtooth shaped waveform for deflecting said beam, said image reproducing device having first and second beam controlling electrodes having inherent capacitive coupling, said sawtooth current producing means comprising means controlling the fly-back and peak-to-peak amplitude of said current for the aspect ratio $a:b$, means applying said television signals to said first electrode, means connecting said sawtooth current producing means to said second electrode for suppressing said electron beam during said fly-back time, and means coupling said sawtooth current producing means to said one electrode to cancel signals applied thereto through the capacitive coupling between said electrodes.

References Cited in the file of this patent

UNITED STATES PATENTS

| | | |
|---|---|---|
| 1,978,684 | McReary | Oct. 30, 1934 |
| 2,384,717 | Wilson | Sept. 11, 1945 |
| 2,789,251 | Ebbeler | Apr. 16, 1957 |
| 2,855,458 | Rogers | Oct. 7, 1958 |

FOREIGN PATENTS

| | | |
|---|---|---|
| 678,034 | Great Britain | Aug. 27, 1952 |
| 158,966 | Australia | Sept. 22, 1954 |